United States Patent [19]

Hurst

[11] Patent Number: 5,651,846

[45] Date of Patent: Jul. 29, 1997

[54] METHOD AND APPARATUS FOR REMOVING THE PRINTED LAYER OF LABELS FROM SEMIRIGID CONTAINERS

[76] Inventor: Richard Francis Hurst, 303 Heritage Pl. c/o P.O. Box 737, Devon, Pa. 19333

[21] Appl. No.: 516,199

[22] Filed: Aug. 17, 1995

[51] Int. Cl.$^6$ .................................................. B32B 35/00
[52] U.S. Cl. .............................. 156/64; 156/94; 156/247; 156/344; 156/584; 15/59; 15/63; 264/36
[58] Field of Search .................... 156/94, 98, 247, 156/344, 584, 64; 15/59, 63; 264/36; 29/402.03, 402.08

[56] References Cited

U.S. PATENT DOCUMENTS

| | | | |
|---|---|---|---|
| 4,013,497 | 3/1977 | Wolf | 156/344 X |
| 4,717,442 | 1/1988 | Hopson | 156/344 X |
| 4,775,438 | 10/1988 | Funakoshi et al. | 156/344 X |
| 4,834,826 | 5/1989 | Abe et al. | 156/344 |
| 4,861,411 | 8/1989 | Tezuka | 156/247 X |
| 5,123,993 | 6/1992 | Wiggins | 156/94 X |
| 5,152,865 | 10/1992 | Hurst | 156/344 |
| 5,254,201 | 10/1993 | Konda et al. | 156/344 |
| 5,317,794 | 6/1994 | Lerner et al. | 156/584 X |
| 5,466,325 | 11/1995 | Mizuno et al. | 156/344 |

*Primary Examiner*—Mark A. Osele
*Attorney, Agent, or Firm*—John B. Sowell

[57] ABSTRACT

An apparatus and method are provided for delaminating the top printed layer from a three layer paper label adhesively bonded to a semi-rigid plastic or metal container. An underlying pulp layer of the three layer paper is selectively removed leaving only a smooth adhesive layer of the paper label and thereby providing a smooth unprinted surface for relabeling. An apparatus and method are also provided for simultaneously delaminating both the top printed layer and the bottom adhesive layer of a two layer label bonded to a semi-rigid container.

19 Claims, 4 Drawing Sheets

METHOD AND APPARATUS FOR REMOVING THE PRINTED LAYER OF LABELS FROM SEMIRIGID CONTAINERS

BACKGROUND OF THE INVENTION

1. Field of the Invention

The present invention relates to label removing and label stripping machines of the type adapted to remove printed matter from labels that have been placed on semi-rigid and/or flexible containers.

More particularly, the present invention relates to a novel semi-automatic label removing machine which will remove printed matter from labels on soft containers without damaging the container material.

2. Description of the Prior Art

Heretofore, it was known that printed paper, foil or plastic labels could be removed from cylindrical glass containers. My U.S. Pat. No. 4,122,734 shows and describes a label stripping machine for spirally cutting and removing an adhesive label from a glass container which created label trash when removing the labels.

My U.S. Pat. No. 5,152,865 shows and describes a label peeling machine for removing both a label and its adhesive layer as an integral unit from glass containers.

The above mentioned label stripping and peeling machines cannot be used to remove labels from semi-rigid or soft containers including plastic bottles and aluminum containers as the blades used in both of the above mentioned machines are hard and would damage the container material.

It has been suggested that labels could be soaked and then scrapped from plastic or aluminum containers, however, problems associated with leaching of plastic containers, oxidizing of metal containers and scratching these containers have rendered these suggested practices unusable, inoperable or not feasible when permanent pressure sensitive adhesives have been employed to affix the labels on the containers.

It would be extremely desirable to provide a method and an apparatus that would remove all traces of printed matter from labels to provide a print free surface for relabelling when the above mentioned permanent pressure sensitive adhesives have been employed with labels placed on semi-rigid containers as well as rigid glass containers.

SUMMARY OF THE INVENTION

It is a principal object of the present invention to remove the entire printed surface of a label applied to a soft or semi-rigid container.

It is a principal object of the present invention to remove the entire printed surface of a printed label and substantially all of the pulp layer of a three-layer paper label, leaving a surface acceptable for relabelling.

It is a principal object of the present invention to remove the entire printed layer and the entire adhesive layer of a two-layer plastic label.

It is a principal object of the present invention to remove the entire label and adhesive of an overlapping wrap-around label after being slit with a tool.

It is a principal object of the present invention to remove at least the top printed layer of an adhesive label from a container and to store it for future verification of removal.

It is a principal object of the present invention to apply a predetermined amount of heat to a label having heat-sensitive adhesive to soften the adhesive to facilitate removal.

It is a principal object of the present invention to apply heat to a heat-sensitive overlapping wrap-around label to cause it to shrink while on the container so as to expose the container surface between opposing edges of the shrunken label.

According to these and other objects of the present invention, there is provided a novel method and apparatus for removing the printed layer of a label on a rigid or semi-rigid containers. The method comprises positioning the label on the container to be removed juxtaposed a delaminating adhesive tape and pressing a pressure pad against the back of the tape forcing the adhesive side of the delaminating tape against the printed label and simultaneously moving the container relative to the delaminating adhesive tape with a force applied thereto to simultaneously transfer the label material from the container to the delaminated adhesive tape.

DESCRIPTION OF THE PREFERRED EMBODIMENTS

In my U.S. Pat. No. 5,152,865 it was explained that paper and plastic labels having permanent pressure sensitive adhesives could be successfully removed from glass bottle containers. When such labels are placed on semi-rigid containers such as plastic containers or aluminum containers there is no safe, economical or practical way to remove the label without damaging the container.

Figure 1:
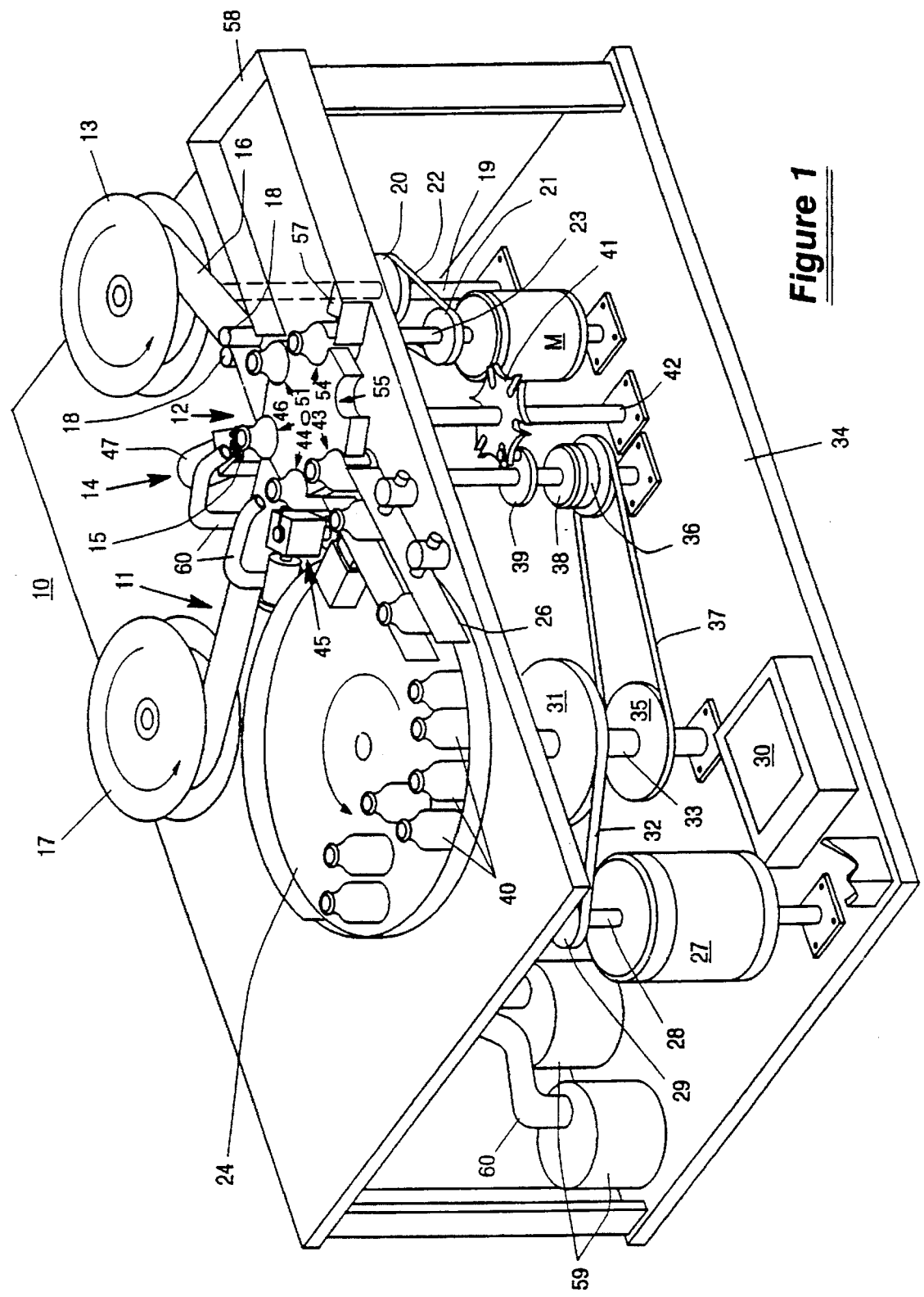
FIG. 1 is an isometric drawing of the preferred embodiment apparatus for removing the printed surface layer of a label that is adhesively bonded to a semi-rigid container.
Figure 2:
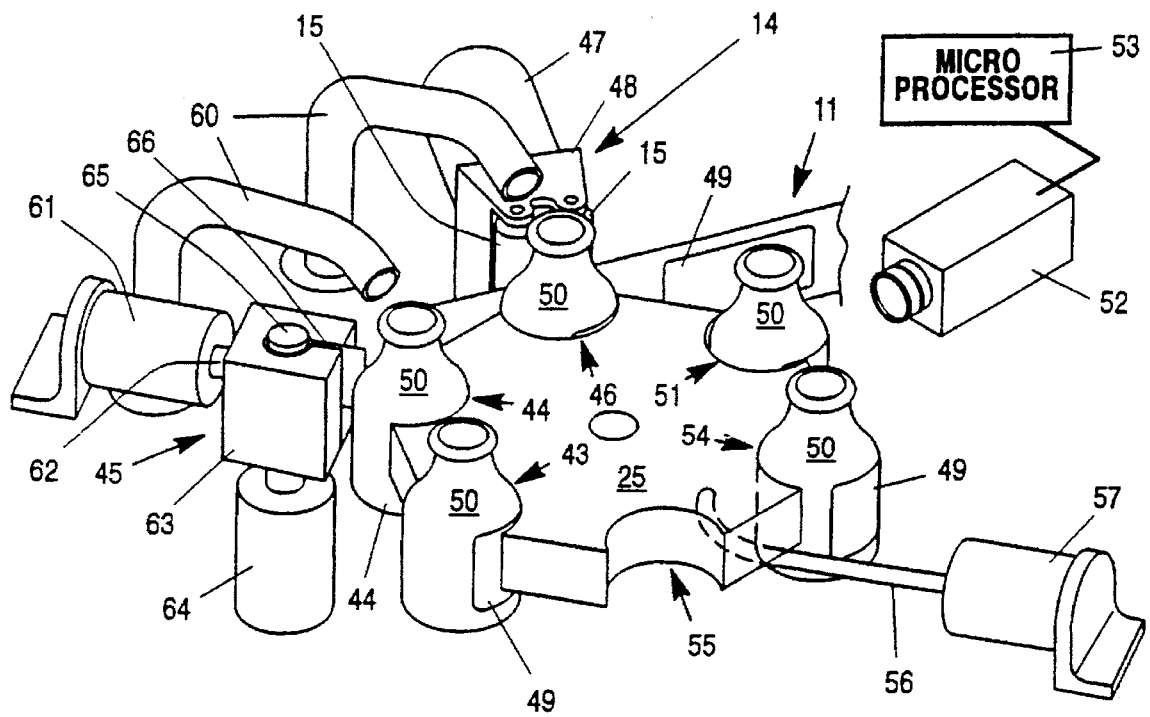
FIG. 2 is and enlarge isometric drawing showing the indexing positioner of the apparatus shown in FIG. 1.

Refer now to FIGS. 1 and 2 showing isometric drawings in schematic form of a preferred embodiment apparatus for removing the printed surface layer of adhesively bonded labels on semi-rigid containers. The delaminating machine 10 is provided with a reel of delaminating tape 11 which passes a delaminating station 12 and is taken up on a take-up reel 13. A forcer 14 comprising a pair of resilient rollers 15 positioned behind the tape 11 and forces the adhesive side 16 of the tape 11 into engagement with a label 49 on a container 50. The tape 11 is despooled from the supply reel 17 by a pair of pinch rollers 18. The take-up reel 13 is continuously driven through shaft 19 by a friction clutch 20 which in turn is driven by a pulley 21 and belt 22 driven by shaft 23 of motor M which also drives the pinch rolls 18. In the preferred embodiment of the present invention, the means for supplying containers is shown as a bottle feed disk 24 which supplies semi-rigid labeled bottles to indexing positioner 25, shown as an indexing wheel having a plurality of stations for receiving bottles from disk 24 via adjustable parallel guides 26. Circumferential guides (not shown) retain bottles 40 within their workstations until removed.

In this preferred embodiment, a first motor drive 27 has a pulley 29 on shaft 28 which is employed to drive pulley 31 via belt 32. Shaft 33 is vertically mounted on frame 34 and drives pulley 35 and friction drives autofeed disk 24. Pulley 35 drives an electromechanical clutch 36 via belt 37, and when engaged, the clutch 36 drives shaft 38 on which a Geneva driver 39 is mounted. The Geneva driver is operable by Geneva gear 41 and provides intermittent rotary motion as is well known in the art. Shaft 42 coupled to Geneva gear 41 imparts intermittent rotary motion to index positioner 25. Programmed logic controller 30 provides selectable machine operation, timing and sequencing. From the aforementioned description, it will be understood that labeled semi-rigid bottles 40, with printed labels 49 adhesively bonded thereto, are moved from bottle feed disc 24 to index positioner 25 which carries bottles to a plurality of workstations to be described hereinafter.

Refer now to FIG. 2 showing a schematic drawing and plan view of the indexing positioner 25 showing plurality of work stations. Work station 43 is located opposite the adjustable parallel guides 26 where bottles enter into the indexing wheel or positioner 25. Station 44 is shown as the work station for a label slitting device 45 and a hot air blower 60. Work station 46 is the main delaminating station where bottles are rotated and heated in their work station and the printed layer of the label is transferred to the delaminating tape 11 while the delaminating tape is forced by forcer 14 into engagement with the label 49. The forcer 14 comprises an air cylinder actuator 47 and a yoke assembly 48 on which are mounted two resilient rollers 15. As will be explained in greater detail hereinafter, labeled bottle 50 is rotated in work station 46 as the delaminating tape 11 is moved from left to right, while being forced into engagement with the label 49 on bottle 50 by forcer 14. This action will cause the adhesive side 16 of delaminating tape 11 to lift at least the top printed layer as will be described hereinafter. Hot air blowers 60 are supplied hot air by generators 59. The hot air softens heat sensitive adhesives to facilitate delamination. After the top layer of the label is removed, the pulp and/or the adhesive layer of the label is removed. The container is electronically scanned at scan work station 51. The scan station comprises video camera 52 which will generate an electrical signal indicative of the reflective light surface of the container which is transferred to microprocessor 53 that has been programmed with sufficient information to determine if the quality of label removal desired has been achieved. If quality is insufficient, a reject bottle 50 is moved past exit work station 54 and on to work station 55 for reprocessing. If quality of label removal is sufficient, bottle 50 is moved to work station 54 and moved by retractable guide 56 actuated by air cylinder 57 into accumulator 58.

Figure 3:
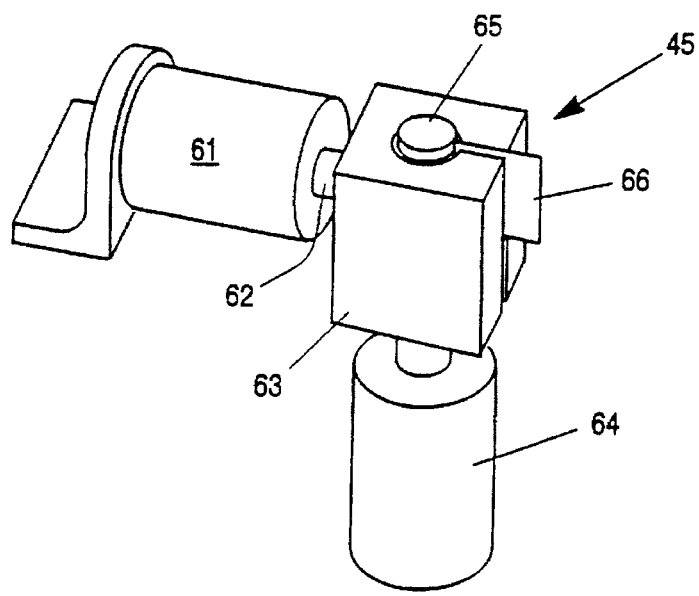
FIG. 3 is an enlarged isometric view of a label slitter of the type employed at the slitting station of FIG. 2.

Refer now to FIG. 3 showing an enlarged isometric view of a preferred label slitter 45 of the type employed at slitter station 44. The label slitter 45 comprises a air cylinder 61 having a piston rod 62 which imparts a radial force to slitter block 63 which is movably mounted on frame 34. The slitter block 63 is shown having a vertical mounted air cylinder 64 which has a slitter blade 66 mounted on its movable rod 65. The programmed logic controller 30 is preferably employed at the slitter station 44 and may also be employed to actuate air cylinders 61 and 64 when a slitting operation is desired. In the preferred embodiment of the present invention, different types of bottles that require slitting are usually run at the same continuous operation and each bottle being processed would be programmed to have a slitting operation performed on the label.

Figure 4:
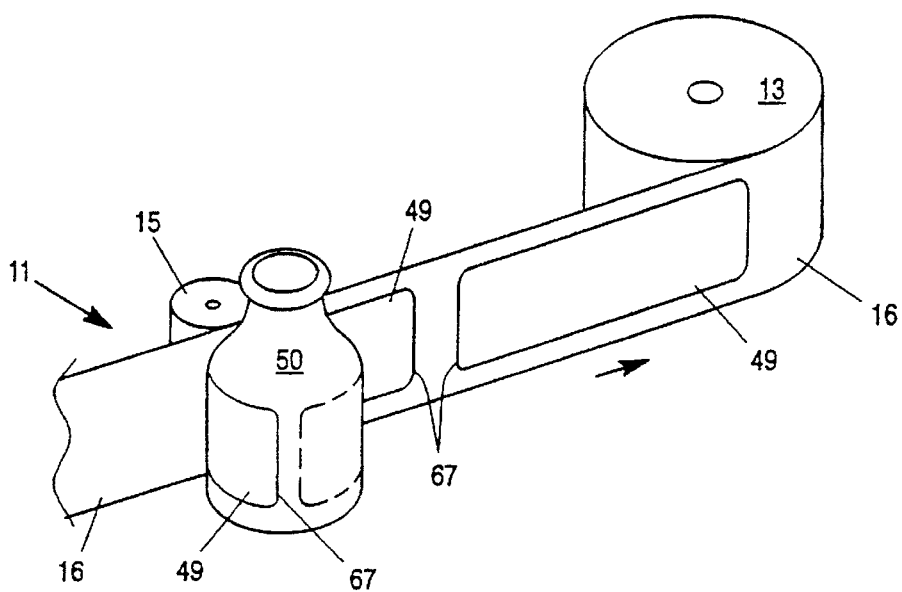
FIG. 4 is an enlarged isometric view of a container having a printed label being removed by a length of delaminating tape which illustrates the principal of the present invention.

Refer now to FIG. 4 showing an enlarged isometric view of a container 50 having a printed label 49 adhesively bonded thereon. The aforementioned resilient pressure rollers 15 are pressed upon the back of the tape 11 with sufficient pressure to conform the adhesive layer 16 to the contour of the printed label. When the pressure sensitive adhesive 16 is selected to be of sufficient strength to overcome the bond of label 49, the tape adhesive 16 will lift the edge 67 of the label 49 and delaminate it from the container 50. Different types of labels will require different operations to remove the printed layer, the pulp layer, and in some cases, the adhesive layer to be described hereinafter.

Figure 5:
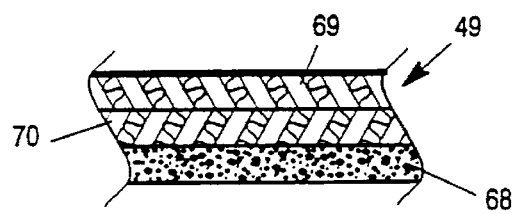
FIG. 5 is a greatly enlarged section taken through a three-layer paper label of the type commonly attached to plastic and metal containers with pressure sensitive adhesive.

Refer now to FIG. 5 showing a greatly enlarged section taken through a three-layer paper label 49 of the type commonly employed on plastic bottles with a contiguous layer 68 of permanent pressure sensitive adhesive on the back of the label. The printed layer 69 is the top layer. The adhesive layer 68 is the bottom layer. The top layer and the bottom layer are separated by a pulp paper layer 70.. It has been found that when the adhesive bond between the tape adhesive layer 16 is stronger than the bond between top layer 69 and pulp layer 70 the printed layer 69 will be transferred to the tape adhesive 16 as it passes through the delaminating station 46. If the initial delaminating process does not remove all three layers shown in FIG. 5, it will at least remove the printed layer 69 and a portion of the pulp layer 70. Successive delaminating operations will remove substantially all of the pulp layer 70 leaving a smooth unprinted surface suitable for subsequent relabelling.

Figure 6:
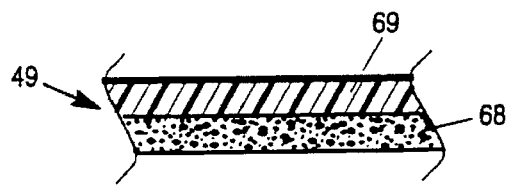
FIG. 6 is a greatly enlarged section taken through a two-layer plastic label of the type commonly employed on plastic and metal containers.

Refer now to FIG. 6 showing a greatly enlarged section taken through a two-layer plastic label of the type commonly employed on plastic, metal and glass containers using pressure sensitive adhesives 68. The top plastic printed layer 69 usually comprises a strong plastic film such as mylar or vinyl which will support printing thereon. The adhesive layer 68 is of a type that is often employed with plastic films used in the pharmaceutical and diagnostic industries. It has been found that the plastic layer 69 shown in FIG. 6 can be removed with its adhesive layer 68 as an integral unit employing the delaminating process described hereinbefore.

Figure 7:
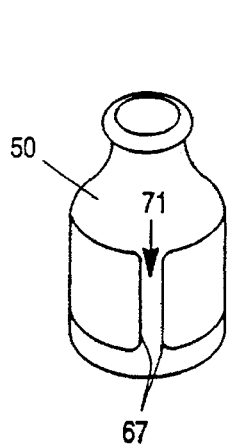
FIG. 7 is an isometric view of a semi-rigid container showing a label having a gap between opposing label edges exposing container surface material.

Refer now to FIG. 7 showing an isometric view of a bottle 50 with attached label 49 of the type shown in FIGS. 5 or 6. Opposing label edges 67 provide a gap 71 exposing surface of bottle 50 therebetween. An edge 67 must be lifted to start the delamination process.

Figure 8:
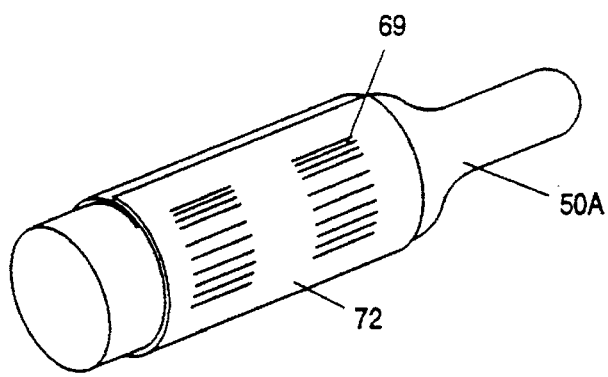
FIG. 8 is an enlarged isometric view of a wrap-around plastic label of the type commonly used on plastic and metal containers.

Refer to now to FIG. 8 showing an isometric view of an overlapping wrap-around label 72 of the type commonly used on syringes or ampule containers 50A employing an adhesive layer 68. The plastic label 72 is wrapped around itself and does not provide a gap 71 or edges 67 of the type shown in FIG. 7. When such plastic labels are to be removed, they are first slitted to form a gap 71 at the slitting station 44 employing the slitter device 45.

When two-layer plastic labels are employed as shown in FIG. 6, and said labels are wrap-around and overlapping, it has been shown that shrinking with hot air will effectively provide a gap 71. It will be understood that the delaminating process starts at label edge 67 whether provided initially, or by the slitter, or by heat shrinking. Once delamination starts, the complete label 72 can be removed usually in a single rotational pass over delaminating tape adhesive 16.

Figure 9:
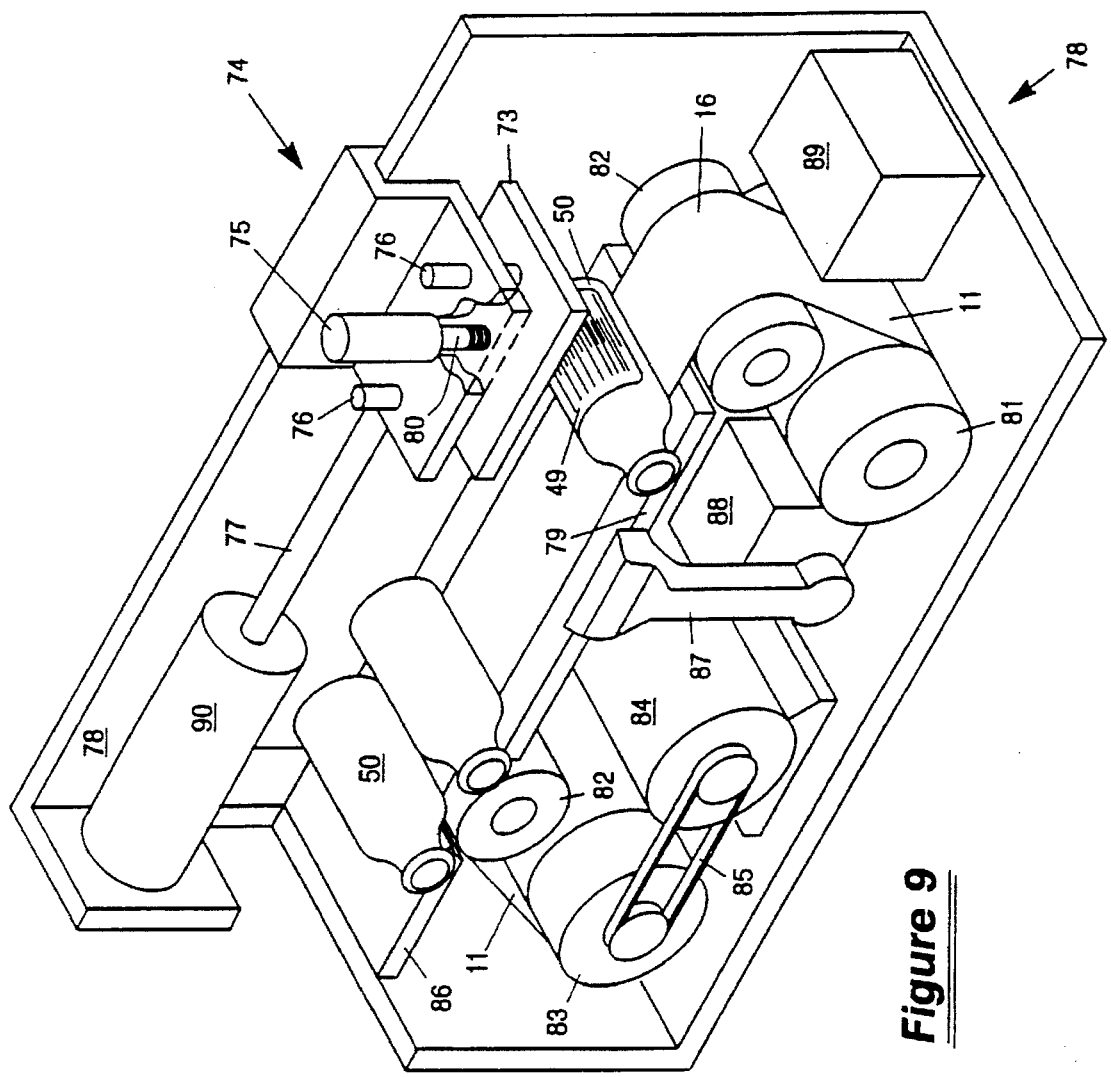
FIG. 9 is an isometric view of another apparatus employed for removing difficult to remove printed surface layers and labels adhesively bonded to a container.

Refer now to FIG. 9 which shows another preferred embodiment of the invention in isometric view wherein labeled container 50 is frictionally rotated on adhesive side 16 of delaminating tape 11 by resilient friction pad 73 movably mounted on slide plate 74 by rod 80 and cylinder 75. Guide pin 76 position pad 73 when actuated downward toward container 50 by piston rod 80 of air cylinder 75. Horizontal movement of resilient pad 73 is caused by retraction of air cylinder rod 77 within air cylinder 90 mounted to frame 78. It will be understood that the downward resilient force of friction pad 73 and simultaneously horizontal movement across tape 11 by retracting air cylinder rod 77 of air cylinder 90 causes container 50 to rotate the exposed label 49 to tape adhesive 16 on tape 11 that is supported by resilient pressure plate 79.

Delaminating tape 11 is supplied by tape supply reel 81 rotatably mounted on frame 78. Idler rollers 82 rotatably mounted on frame 78 keep tape 11 positioned on plate 79. Tape take-up reel 83 rotatably mounted on frame 78 is driven by belt 85 attached to drive motor Preferably take-up reel 83 pulls tape 11 from supply reel 81 and positions an unused portion of delaminating tape between idlers 82 on plate 79. After completing a label delamination operation, the used tape is advanced by motor 84 onto takeup reel 83. Hot air generator 88 may supply hot air through hot air nozzle 87 to soften heat sensitive adhesives 16 and/or 68 prior to delamination. Separator plate 86 separates delaminated containers 50 from the adhesive on tape 11. Air cylinder 90, air cylinder 75, motor 84 and hot air generator 88 are controlled by program logic controller 89 of the type explained hereinbefore.

Having explained a preferred embodiment and a modification of the present invention in an apparatus that has sufficient flexibility to process numerous types of labels that are placed on rigid or semi-rigid containers it will be appreciated that the delaminating apparatus and method described hereinbefore will remove from semi-rigid containers numerous types of labels which could not be removed before. Thus, the present invention permits relabeling of containers which contain valuable ingredients which could not be reused before.

What is claimed is:

1. A method for removing printed matter from a label on a container, comprising the steps of:
providing a container having a printed label adhesively bonded thereto,
positioning a delaminating adhesive tape juxtaposed the printed label to be removed with the front adhesive side of the tape facing the label,
positioning a resilient pressure pad juxtaposed the printed label at the non-adhesive side of the delaminating adhesive tape,
forcing said resilient pressure pad against the non-adhesive side of said delaminating adhesive tape,
simultaneously moving said delaminated adhesive tape relative to said labeled container with a force on said resilient pressure pad, and
removing said printed matter from said container by transferring said printed material layer to said delaminating adhesive tape.

2. The method as set forth in claim 1 wherein the step of providing a container comprises providing a cylindrical container on which the printed label is adhesively bonded thereon comprises the step of providing a gap between opposing edges of said printed label which exposes a surface of said container.

3. The method as set forth in claim 2 wherein the step of providing a gap between opposing edges of said label further comprises the step of slitting said label to provide the gap between said opposing edges of said label.

4. The method as set forth in claim 2 wherein said label comprises a top printed layer, a bottom adhesive layer and a pulp layer therebetween, and
the step of simultaneously removing said printed matter from said container further includes the step of removing portions of said pulp paper layer after removing the top printed layer.

5. The method as set forth in claim 2 wherein said label on said container comprises a heat-shrinkable plastic label with overlapped edges adhesively bonded to said container and further includes the step of selectively heating said plastic label to shrink said overlapped edges to provide the gap between opposing label edges.

6. The method as set forth in claim 2 wherein said label comprises a top printed layer and a bottom adhesive layer and the step of simultaneously removing said printed matter on said container comprises the step of,
simultaneously heating said top printed layer and said bottom adhesive layer together to facilitate delamination of said label as an integral unit.

7. The method as set forth in claim 2 wherein said label comprises a top plastic film printed layer and a bottom adhesive layer having a continuous layer of adhesive thereon, and
said step of transferring said printed material to said delaminating adhesive tape comprises the step of transferring said label with said adhesive thereon as an integral unit.

8. The method as set forth in claim 1 which further includes the step of,
scanning said container after removing said printed matter to determine if a predetermined amount of the label has been removed.

9. The method as set forth in claim 1 which further includes the step of storing the used delaminating adhesive tape with said printed matter thereon as evidence of removal of said printed matter.

10. Apparatus for removing printed labels from containers, comprising:
a frame,
means on said frame for supplying containers having printed labels adhesively bonded thereto to be removed,
positioner means adjacent to said means for supplying containers for receiving said containers and transferring said containers to a work station position,
delaminating adhesive tape supply means on said frame for holding a length of tape having an adhesive side thereon juxtaposed said label on said container,
resilient force means on said frame for applying a force on a back of said delaminating tape to engage said adhesive side into resilient pressure contact with said label on said container, and
means for moving said delaminating adhesive tape relative to said label on said containers and for simultaneously removing said labels from said container and for transferring said labels to said delaminating adhesive tape.

11. Apparatus as set forth in claim 10 wherein said means for moving said delaminating adhesive tape further includes hot air supply means for softening the adhesive on said adhesively bonded labels prior to removal of said labels from said containers.

12. Apparatus as set forth in claim 10 which includes a plurality of workstations on said positioner means that are selectively operable prior to removing said label at a removal workstation.

13. A method for removing printed matter from a label adhesively bonded to a container comprising the steps of:
 a. providing a container having a printed label adhesively bonded thereto,
 b. positioning a delaminating adhesive tape juxtaposed the printed label to be removed with the a front adhesive surface of the tape facing the label,
 c. positioning the labeled container between a resilient pressure pad means and the tape adhesive,
 d. rotating said container against said tape adhesive and said resilient pad means,
 e. applying pressure to said pad means to cause said label on said container to make contact with said delaminating tape adhesive tape while simultaneously rotating said container to expose the entirety of said label to said delaminating tape adhesive, and
simultaneously transferring said label to said delaminating tape adhesive.

14. The method as set forth in claim 13 wherein the step of providing said container having a printed label adhesively bonded thereon further comprises the step of providing a gap between the opposing edges of said label to expose a surface of said container therebetween.

15. The method as set forth in claim 14 wherein the step of providing a gap between the opposing edges of said label further comprises the step of slitting said label to provide said gap between opposing label edges.

16. The method as set forth in claim 14 wherein the step of providing a gap between the opposing edges of said label further comprises the step of applying heat to said label, and heat shrinking said label of a heat shrinkable material to cause said label material to shrink.

17. The method of claim 16 wherein said label comprises the top printed plastic film layer and a bottom adhesive layer having a continuous adhesive thereon, and said step of simultaneously transferring said label to said delaminating tape adhesive comprises the step of transferring said label with said adhesive thereon as an integral unit.

18. The method as set forth in claim 16 which further includes the step of scanning said container after removing said printed matter to determine if a predetermined amount of the label has been removed.

19. The method of claim 13 wherein said label comprises the top printed plastic film layer and a bottom adhesive layer having a continuous adhesive thereon, and said step of simultaneously transferring said label to said delaminating tape adhesive comprises the step of transferring said label with said adhesive thereon as an integral unit.

* * * * *